Patented Dec. 12, 1922.

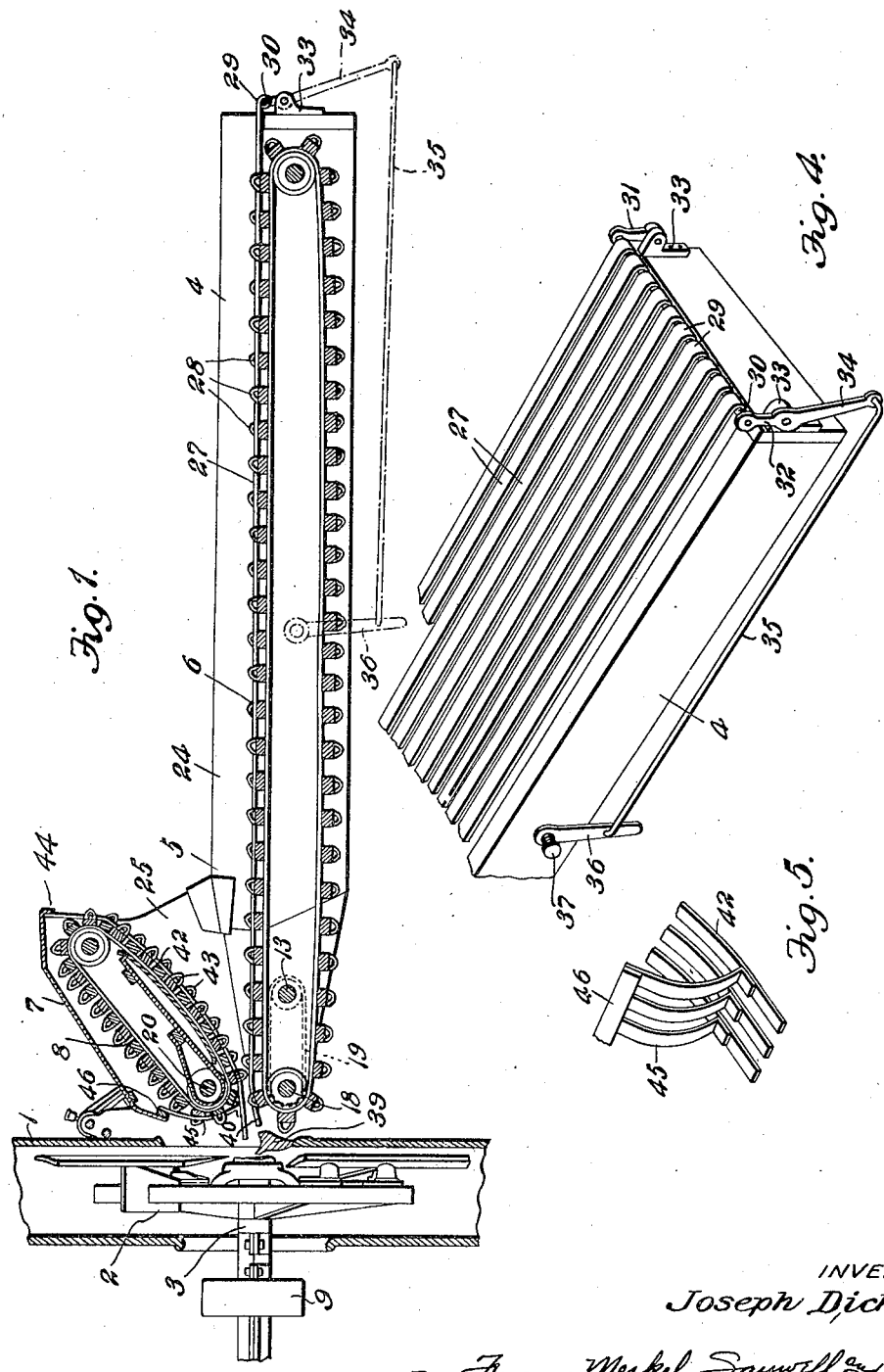

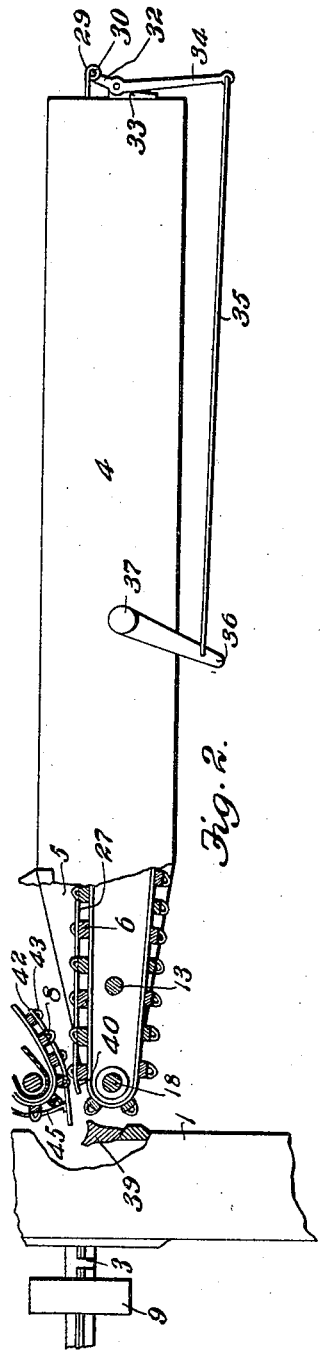

1,438,365

UNITED STATES PATENT OFFICE.

JOSEPH DICK, OF CANTON, OHIO, ASSIGNOR TO THE JOSEPH DICK MANUFACTURING COMPANY, OF CANTON, OHIO, A CORPORATION OF OHIO.

FODDER CUTTER.

Application filed July 25, 1919. Serial No. 313,203.

*To all whom it may concern:*

Be it known that I, JOSEPH DICK, a citizen of the United States, residing at Canton, in the county of Stark and State of Ohio, have invented certain new and useful Improvements in Fodder Cutters, of which the following is a specification.

The invention relates to fodder cutters and more especially to the feed mechanism in machines for cutting fodder and other forage such as alfalfa and similar plants which are inclined to become tangled and bunched together tending to choke the feed mechanism and to catch against the cutter bar; and the objects of the improvement are, to provide longitudinally movable conveyer bars in combination with the chain conveyers, means for moving the conveyer bars toward or away from the cutter bar, means for operating all of the conveyer bars as a unit, the conveyer bars being so arranged that their extremities are at all times spaced from the cutter bar, thereby preventing forage from catching against the cutter bar.

With these objects in view the invention consists in the novel construction and arrangement of parts, hereinafter described, illustrated in the accompanying drawings, and particularly pointed out in the appended claims, it being understood that various changes in the form, proportions, size and details of construction may be made within the scope of the appended claims, without departing from the spirit or sacrificing any of the advantages of the invention.

The invention thus set forth in general terms is illustrated in the accompanying drawings forming part hereof, in which—

Figure 1 is a longitudinal section of the feed trough and feed hopper showing the general arrangement of the conveyer bars.

Fig. 2 is a similar view partly in elevation showing the conveyer bars in the opened position.

Fig. 3 is a plan view of the feed trough showing the conveyer bars in the position shown in Fig. 1.

Fig. 4 is a fragmentary perspective view of the conveyer bars and the mechanism for operating them.

Fig. 5 is a fragmentary perspective view of the bars of the feed hood.

Fig. 6 is a detail perspective view of one of the conveyer bars.

A practical embodiment of the invention is disclosed in the accompanying drawings, forming part of this specification, in which similar numerals of reference indicate corresponding parts throughout the several views.

The fodder cutter includes the case 1 having the usual cutting and blowing mechanism 2 therein, rigidly mounted upon the main shaft 3, which is axially journaled in the case; a feed trough 4 and feed hopper 5 having an endless conveyer 6 therein; and a feed hood 7 mounted upon the feed hopper and having an inverted endless conveyer 8 therein.

The power pulley 9 is secured on the rear end of the main shaft 3, and the gear pinion 10 is secured on the forward end of the main shaft; which pinion meshes with a gear wheel 11 secured on a counter-shaft 12 which is journaled in bearings on one side of the feed trough 4 and extends longitudinally thereof. The counter-shaft 12 thus rotates continuously when the cutting and blowing mechanism is in operation. A transverse counter-shaft 13 is journaled in the bottom of the feed hopper and has secured on one end a beveled gear wheel 14 adapted to mesh alternately on opposite sides with either one of a pair of spaced beveled pinions 15 and 16 journaled on the counter-shaft 12 on each side of a double clutch 17 which is feathered or splined on the counter-shaft.

Power is transmitted from the counter-shaft 13 to the rear shaft 18 of the feed conveyer 6 by means of a chain gear 19 and in turn power is transmitted from the shaft 18 to the lower rear shaft 20 of the feed hood conveyer.

The pinions 15 and 16 are provided with opposing clutch faces 21 and 22 respectively adapted to be engaged by the clutch sleeve 17 so that when it is desired to operate the feed conveyers the clutch member is shifted from its neutral position opposite the center of the beveled gear wheel 14 into engagement with either one or the other of the pinions, depending upon the direction it is desired to operate the conveyer.

The gearings are so arranged that the conveyers are operated rearward for feeding the machine when the clutch sleeve 17 is engaged with the pinion 16 and will operate in the reverse direction when the clutch sleeve is engaged with the rearward pinion 15.

The rear shaft 18 is of the feed conveyer 6 and the rear shaft of the hood conveyer 8 are journaled in the sides of the conveyer and hood respectively at the rear end thereof and adjacent to the forward side of the case 1, so that fodder is fed directly into the fodder cutters.

The upright side walls of the feed trough 4 are provided with the outwardly flared upwardly extending portions 24 and the rear ends of these walls are secured to the forward ends of the upright side walls 25 of the feed hopper. The feed conveyer 6 is mounted between the side walls of the feed trough and hopper.

The bottom of the feed trough is formed by the laterally spaced longitudinal conveyer bars 27, between which bars the protruding teeth 28 of the trough conveyer 6 operate longitudinally of the feed trough. These conveyer bars are free at their rearward extremities, their forward extremities being provided with eyes 29 by means of which they are mounted upon a rod 30, said rod being carried between the levers 31 and 32 pivoted to suitable brackets 33 mounted upon the rear end of the feed trough.

The lever 32 is provided with a depending arm 34 which is connected by a link 35 with the operating handle 36 pivoted upon the side of the feed trough at 37, a friction device such as the spring 38 being located around the pivotal member 37 and bearing against the operating handle. The rear ends of the longitudinal conveyer bars 27 are preferably inclined slightly downward to the cutter bar 39 as shown at 40, and the extremities of the bars are spaced slightly from the cutter bar when in the rearmost position as shown in Figs. 1 and 3.

When the operating handle 36 is moved rearward the rod 30 is moved forward, thereby sliding the conveyer bars 27 longitudinally into the position shown in Fig. 2 and increasing the space between the rear extremities of said conveyer bars and the cutter bar 39.

The inverted face of the feed hopper is formed by the laterally spaced curved longitudinal bars 42 between which the protruding teeth 43 of the hood conveyer 8 operate longitudinally of the feed hood. The hood conveyer co-operates with the trough and hopper conveyer for feeding fodder into the feed opening of the fodder cutter.

The bars 42 extend rearwardly to a point above the edge of the cutter bar 39, said bars being supported at their upper extremities by connection with the hood at 44, the lower rear extremities of the bars being free, each bar being independently supported by means of the curved bar 45 attached to the bar 42 at a point spaced from its rear extremity, said curved bars being attached to a transverse bar 46 carried by the hood.

In the operation, the fodder, as it is carried rearwardly by the protruding conveyer teeth, slips over the free ends of the bottom bars and under the free ends of the hood bars, and since there is no connection between these free ends of the bars and as they are spaced from the cutter bar there is no tendency for the fodder to choke the feed mechanism or to catch against the cutter bar. When feeding alfalfa or similar fodder which is inclined to become tangled or bunched together, the operating handle may be moved into the position shown in Fig. 2 moving the bottom bars forwardly in the conveyer thus increasing the free space between the free ends of the bottom bars and the cutter bar and allowing the tangled and bunched stalks to slip over the free ends of the bottom bars and drop from the conveyer, preventing their catching against the cutter bar and choking the throat of the feed hopper.

It will be understood that for the same material no adjustment of the conveyer bottom bars is necessary and the same may be fixed in the conveyer with their rear ends spaced from the cutter bar; but in order that a machine may be used for cutting different materials, it is desirable to provide means for adjusting the bottom bars toward and from the cutter bar to vary the spaced interval between the rear ends of the bottom bars and the cutter bar.

I claim:—

1. A fodder cutter including a transverse cutter bar, an endless belt having projecting teeth thereon, laterally spaced, longitudinal, bars between said teeth, the rear ends of said bars having a free space between them and the forward side of the cutter bar.

2. A fodder cutter including a transverse cutter bar, an endless belt having projecting teeth thereon, laterally spaced, longitudinal, bars between said teeth, the rear ends of said bars having a free space between them and the forward side of the cutter bar, and means for adjusting said bars longitudinally to vary the extent of said free interval.

3. A fodder cutter including a transverse cutter bar, an endless belt having projecting teeth thereon, laterally spaced, longitudinal, bars between said teeth, the rear ends of said bars having a free space between them and the forward side of the cutter bar, and means for simultaneously adjusting said bars longitudinally to vary the extent of said free interval.

4. A fodder cutter including a transverse cutter bar, an endless belt having projecting teeth thereon, laterally spaced, longitudinal, bottom bars between said teeth, the rear ends of the bottom bars being spaced at a free interval in front of the forward side of the cutter bar, means connecting said bars at their forward ends, and means connecting to said connecting means for adjusting the bottom bars longitudinally to vary the extent of said free interval.

5. A fodder cutter including a transverse cutter bar, an endless belt having projecting teeth thereon, laterally spaced, longitudinal, bottom bars between said teeth, the rear ends of the bottom bars being spaced at a free interval in front of the forward side of the cutter bar, a rod connecting said bottom bars at their forward ends, and means for moving said rod longitudinally of the conveyer to vary the extent of said said interval.

6. A fodder cutter including a transverse cutter bar, an endless belt having projecting teeth thereon, laterally spaced, longitudinal face bars between said teeth, the rear ends of the face bars having a free space between them and the cutter bar and the adjacent face bars, and laterally spaced, supporting bars connected with the reverse sides of the face bars adjacent to the free ends thereof.

JOSEPH DICK.